June 20, 1967

E. M. LANIER 3,326,500

AIRCRAFT LIFT-INCREASING DEVICE

Filed Nov. 25, 1964

INVENTOR.
EDWARD M. LANIER

BY *Kenyon, Palmer, Stewart & Estabrook*

ATTORNEYS

June 20, 1967 E. M. LANIER 3,326,500
AIRCRAFT LIFT-INCREASING DEVICE
Filed Nov. 25, 1964 3 Sheets-Sheet 2
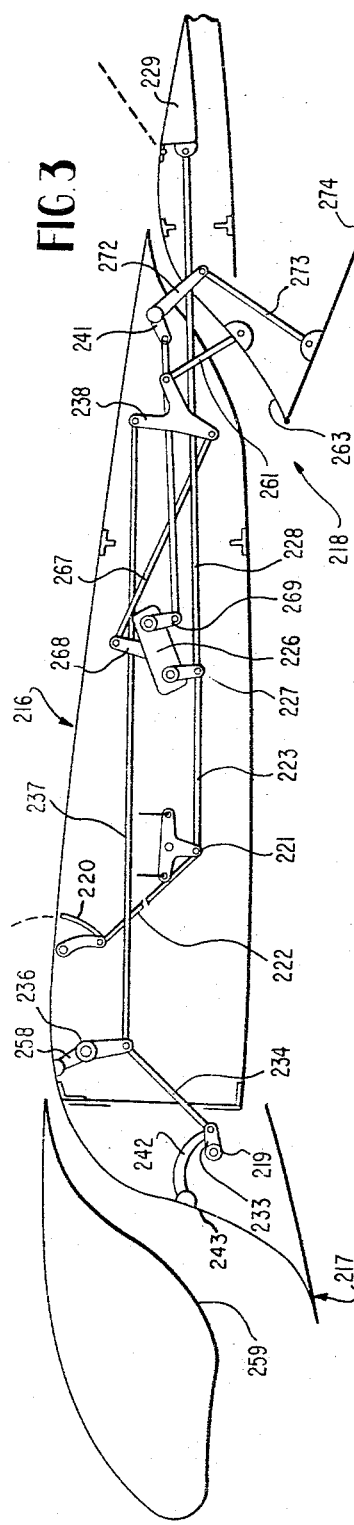
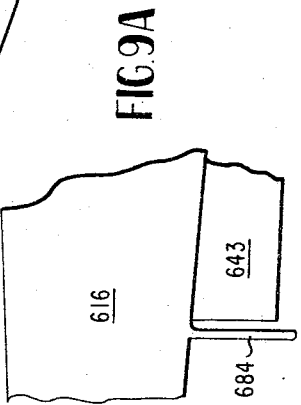
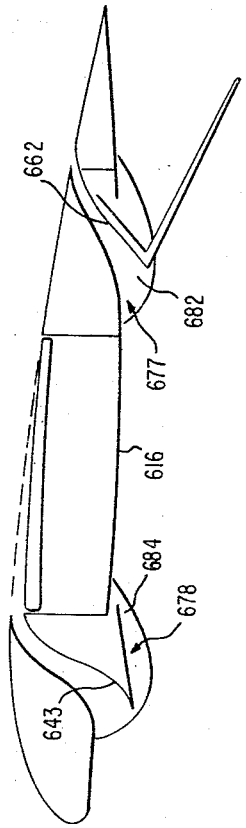
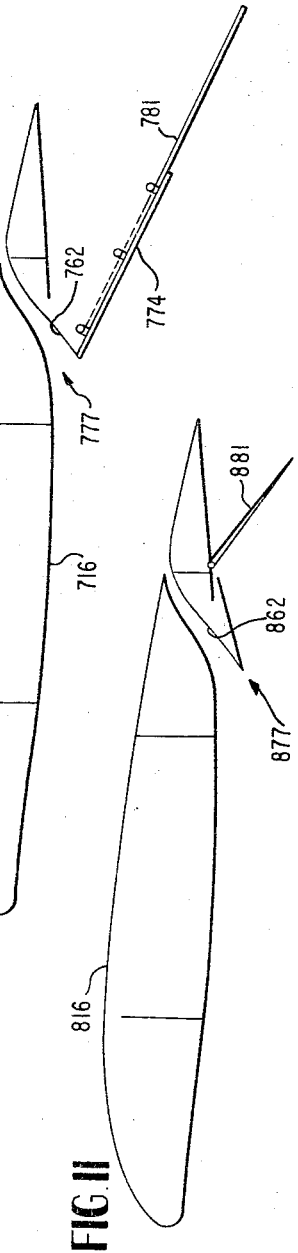
INVENTOR
EDWARD M. LANIER
ATTORNEYS June 20, 1967  E. M. LANIER  3,326,500
AIRCRAFT LIFT-INCREASING DEVICE
Filed Nov. 25, 1964  3 Sheets-Sheet 3

INVENTOR.
EDWARD M. LANIER
BY
ATTORNEYS

United States Patent Office 3,326,500
Patented June 20, 1967

3,326,500
AIRCRAFT LIFT-INCREASING DEVICE
Edward M. Lanier, 900 Newportville Road,
Croydon, Pa. 19020
Filed Nov. 25, 1964, Ser. No. 413,765
12 Claims. (Cl. 244—42)

This invention relates generally to airfoils and more particularly to devices for increasing the lift of airfoils to provide a stable flight at low air speeds and/or more efficient flight at higher speeds. The invention relates specifically to improvements in the nature of the lift-increasing devices disclosed in applicant's prior U.S. Patent 2,678,-784, issued May 18, 1954.

Achieving the design of an aircraft with short take-off and landing capability (STOL) as well as stable low-speed flight characteristics has long been a goal of industry and such characteristics are highly desirable in all types of aircraft now in use. The low speed handling characteristics of a particular aircraft are determined, in general, by the lift characteristics of the wings thereof. These lift characteristics, in turn, are generally a function of what is known in the art as the "mean camber line" of the airfoil cross section. The mean camber line is a line defined by points which lie halfway between vertically aligned points on the upper end lower surfaces of an airfoil, the line intersecting the airfoil chord line at the leading and trailing edges thereof. The chord line of the airfoil is simply defined as a straight line bisecting the leading and trailing edges of the airfoil when viewed in cross section. As a general statement, and up to a certain degree, the greater the deviation of the mean camber line above the chord line in an airfoil the greater the lift of that airfoil. To further generalize, however, the greater the deviation between the camber and chord lines, the greater the drag characteristics of the airfoil. It is common in the prior art to achieve low-drag, high-speed airfoils having high lift characteristics at low speeds, by providing a thin, relatively flat means camber basic airfoil with means to vary the mean camber line in low speed landing and take-off situations. These means generally incorporate flaps on the trailing edge of the airfoil which, at low speeds are downwardly and rearwardly deflectable to effectively increase the curvature of the mean camber line thereby providing a high-lift configuration for low speeds.

Another way of increasing the lifting characteristics of an airfoil is to provide span-wise slots through the wings or slats disposed along the leading edge of the wing the slats being separable from the leading edge to define a slot therebetween. The openings produced by these devices are closeable to provide a low-drag configuration for high-speed operation and are openable to provide lift in low-speed high-angle of attack situation. Low speed lift is provided in the open configuration, since the openings channel the airflow from the high pressure undersurface of the airfoil through the wing and introduce it into the boundary layer of the low-pressure flowing over the upper surface of the airfoil thereby increasing the energy in the boundary layer to delay separation thereof. This delay of separation delays turbulent lift-killing airflow attendant with separation and thereby lowers the stalling speed of the aircraft.

In the above-mentioned prior patent to the applicant, an improvement over the prior art devices has been provided the improvement generally consisting of an openable channel or slot through the airfoil in combination with a lowerable scoop forming the lower portion of the channel disposed beneath. The lowerable scoop increases the flow of air through the channel into the boundary layer of the flow on the upper portion of the wing thereby improving the effectiveness of the channel in increasing low-speed lift of the wing over prior art devices in landing, take-off or maximum glide configurations. The scope of this prior patent also serves to increase the effective curvature of a mean camber line of the airfoil somewhat to thereby further increase lift at low speeds.

It is an object of this invention to improve the lift-increasing capability of prior art devices and, in particular, the prior art device disclosed in the applicant's above-mentioned patent, by providing an extendable, flap-like skirt as an adjunct to the scoop and Venturi-channel devices disclosed in that patent.

It is another object of this invention to provide an airfoil having a fixed member and a movable member to define an air passage through the airfoil for improving flight characteristics of the airplane, the movable member providing a variable dimensioned entrance and exit in the passage to improve the lift of the airplane when the passage is operative and to provide for closing of the entrance and exits to form a smooth airfoil for normal flight.

It is another object of this invention to provide an improved variable lift-increasing Venturi passage through an airfoil wherein flow through the Venturi passage is made more effective through operation of a movable air scoop and flap beneath the Venturi, the scoop and flap being adjustable to regulate the flow through the Venturi and the Venturi being correspondingly adjustable to afford the most efficient airflow therethrough.

It is yet another object of this invention to create a natural airfoil circulation augmenter as well as boundary layer control device which is not dependent on an auxiliary power source.

It is still a further object of this invention to provide a variable flap in conjunction with the wing-mounted scoop-Venturi lift-increasing devices of the prior art to both further increase the pressure head for the Venturi to thereby increase airflow through the Venturi for better boundary layer control and to deflect a portion of the air flowing beneath the wing downward from the flap to further increase the effective mean camber of the airfoil.

It is still another object of this invention to provide the lift-increasing devices of this invention either alone or in combination with prior art control or lift-increase devices to provide a more efficient variable lift aircraft wing than heretofore available.

It is yet another object of this invention to provide a device for increasing the lift of airfoils by changing the configuration thereof to both increase the energy of the boundary layer flow thereover to increase the circulation about the airfoil and to increase the effective mean camber thereof for low speed or maximum glide conditions, the device being retractable at high speed or normal flight conditions to provide a low-drag wing configuration.

These and other objects of this invention will become more obvious to those skilled in the art by reference to the following detailed description when viewed in light of the accompanying drawings in which like numerals therein indicate like parts throughout the figures thereof and wherein:

FIGURE 3 is a sectional view similar to FIGURE 1 of an airfoil incorporating another embodiment of the invention;

FIGURE 9 is a view similar to FIGURE 8 showing a modified lift-increasing device of the type shown in FIGURE 3 in combination with fixed end plates;

FIGURE 9A is a fragmentary end view of the device of FIGURE 9;

FIGURE 10 is a view similar to FIGURE 9 and showing a single modified lift-increasing device in accordance with the invention; and FIGURE 11 is a view similar to FIGURE 10 showing still another modified lift-increasing device in accordance with the invention.

The aforegoing objectives of invention are achieved, in general, by the provision of an improved Venturi slot-scoop structure which is disposed span-wise through an airfoil to increase the airflow circulation thereover through the coaction of the scoop and the Venturi slot arrangement. It should be noted, at this point, that the Venturi structure referred to throughout this specification does not, in the truest sense, constitute a classical Venturi but rather consists of a flow-accelerating channel having an inlet tapering to a restricted throat exit. The Venturi structure of this device could be treated as a full two-dimensional Venturi having an inlet, restricted throat and an enlarged exit with the throat-to-exit portion thereof removed so that the throat and exit are one in the same. Acceleration is accomplished by the Venturi through principles well known in the art. The device further increases the effective mean camber of the airfoil through the increased effective or apparent thickness of the airfoil caused by the presence of the scoop-flap beneath the wing. The improvement over the prior art devices provided by this invention is furnished through incorporation of a flap or skirt on the lower portion of an extendible scoop-slot arrangement in an airfoil. The angle of the flap is variable either independently or in combination with the movement of the scoop to increase or vary the airflow into the scoop slot, the increased airflow being caused in part by the increased pressure head below the scoop generated by the depending flap. The device further increases the effective or apparent mean camber line of the wing when the flap deflects the airflow below the scoop in a downward general direction.

Figure 1:
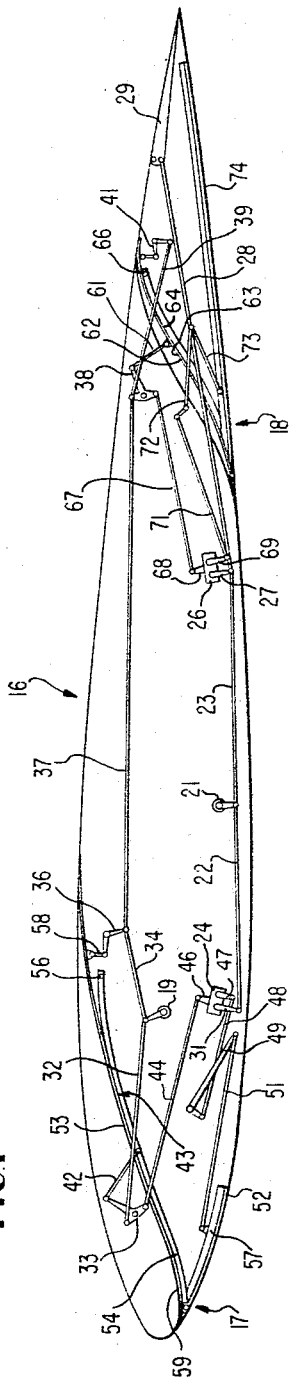
FIGURE 1 is a sectional view of an airfoil in elevation showing a schematic diagram of lift-increasing devices and actuating system therefore in accordance with the invention in a configuration for high speed or normal low-drag flight.

Referring now to FIGURE 1 of the drawings, a lift-increasing device and the actuating members therefor are disposed in an airfoil 16 shown in section and elevation. A forward and a rearward scoop-flap passage are indicated generally at 17 and 18 respectively. The motive force for actuating the components of the device is transmitted to the airfoil through torque tubes 19 and 21 running spanwise through the wing and connected to control members (not shown) in the aircraft.

Actuation of these torque tubes is accomplished by movement of the control members, which movement, through conventional linkages, results in rotation of the tube to effect actuation of the respective flight controlling components. The linkages, although described hereinafter as rods, could of course be cables, hydraulic circuitry or even electrically connected servomotors. The rods referred to hereinbelow are the standard push-pull rods commonly used in aircraft control systems and are pivotally connected to the respective connecting parts. The torque tube 21 is connected through a forward rod 22 and rearward rod 23 to a forward compensating mechanism 24 and a rearward compensating mechanism 26 respectively. Connection of rod 23 to the compensating mechanism 26 is achieved through an input arm 27. A spoiler rod 28 is also connected to the input arm 27 to operatively connect a spoiler 29 thereto for actuation through movement of the torque tube 21. The forward rod 22 is similarly connected to the forward compensating mechanism through an input arm 31.

The torque tube 19 has, connected thereto, a forward push-pull rod 32 which in turn is connected at the other end thereof to a forward scoop bellcrank 33 pivotally mounted proximate the leading edge of the airfoil. A rearward rod 34 is also connected to the torque tube 19 and at the other end thereof, to a forward Venturi bellcrank 36. Extending rearwardly from the forward Venturi bellcrank, an interconnecting rod 37 connects a rear scoop bellcrank 38 thereto. A rearward Venturi actuating a rod 39 extends from the bellcrank 38 to the rear Venturi bellcrank 41 to provide interconnection therebetween.

Returning to the leading edge of the wing, the forward scoop bellcrank 33 has pivotally mounted thereto a forward scoop actuating rod 42 which is connected at the other end thereof, the forward scoop structure generally shown at 43 and a forward flap regulating rod 44. The rod 44 is pivotally connected to a forward flap regulating arm 46 on the compensating mechanism 24. The compensating mechanism 24 has provided thereon a forward flap actuating arm 47 which is connected through a rod 48 to a forward flap bellcrank 49. A forward flap actuating rod 51 pivotally connects the bellcrank 49 to a forward flap 52.

Returning to the scoop structure, the scoop itself is made up of a metal skin portion 53 which is sufficiently thin, to be flexed to a certain degree. The skin 53 is backed up and supported over a major portion of its area by a series of curved stringers 54 which are pivotally connected to the wing structure at a pivot point 56. The skin 53 and the stringers 54 are not connected to one another proximate the pivot point 56 so that some separation therebetween exists in this area as shown in FIGURE 1. The stringers 54 are also pivotally connected to a series of stringers 57 at the other ends thereof to provide structural connection and support for the flap 52. At the upper portion of the scoop, the Venturi bellcrank 36 is pivotally connected to the scoop skin 53 proximate the point of separation from stringers 54 by a push-pull rod 58.

A rigid and somewhat complementary convex-concave skin 59 is disposed in abutting relationship to the scoop skin 53 to form the rearward portion of the leading edge of the airfoil. As shown in FIGURE 1, this surface abuts the scoop skin 53 at points along the entire surfaces thereof to provide a smooth, unbroken airfoil configuration at the surface. Although there is no mechanical connection between the leading edge and the remainder of the airfoil shown in FIGURES 1 and 2 at the point where the section illustrated is taken, structural connection is provided between these parts at suitable intervals along the span of the wing as will be described later.

Moving now to the trailing edge of the airfoil, a system is shown which is similar to that described for the forward scoop structure.

Referring again to the rear scoop bellcrank 38, a rod 61 provides connection thereof to a rear scoop 62. The rear scoop is made up of a metal skin portion 63 and is backed up by curved stringers 64 in a manner identical to the structure described for the forward scoop 43. Also, in a manner similar to the arrangement described for the forward scoop, the stringers 64 are pivoted at a pivot point 66 proximate the top ends thereof. Connected to the rear scoop bellcrank 38 through a rear flap regulating rod 67, is a rearward flap regulating arm 68 on the rear compensating mechanism 26. The rear compensating mechanism also has provided thereon a rearward flap actuating arm 69 which is pivotally connected through a rod 71 to a rearward flap bellcrank 72. A rearward flap actuating rod 73 pivotally connects the bellcrank 72 to a rearward flap 74.

The operation of the devices thus far described is initiated through actuation of the torque tubes 19 and/or 21 by control members in the aircraft cockpit. If the aircraft is in normal flight and actuation of the spolier 29 alone to provide normal control of the aircraft is desired, the torque tube 21 is rotated to actuate the rear push-pull rod 23 and the spoiler push-pull rod 28 to deflect the spoiler 29 and thereby apply control force to the airflow and to the aircraft in a conventional normal manner. The compensating mechanisms 24 and 26 are so designed that, when there is no deflection of the regulating arms 46 and 68 of the forward and rear compensating mechanisms respectively, there is no movement of the actuator arms 47 and 69, regardless of the amount of movement of the input arms 31 and 27. Deflection of the regulating arms 46 and 68 by actuation of the scoops 43 and 62 will, depending on the amount of movement thereof, transmit a portion of the movement through the compensating mechanisms from the input arms 31 and 27 to the actuator arms 47 and 69 until, when scoops and regulating arms are fully deflected, the ratio between the movement of the input arms and the actuator arms reaches a maximum. In this manner, so long as the scoops are in a retracted condition, the spoiler 29 may be actuated through the torque tube 21 without causing actuation of the remaining portion of the linkages heretofore described.

Figure 2:
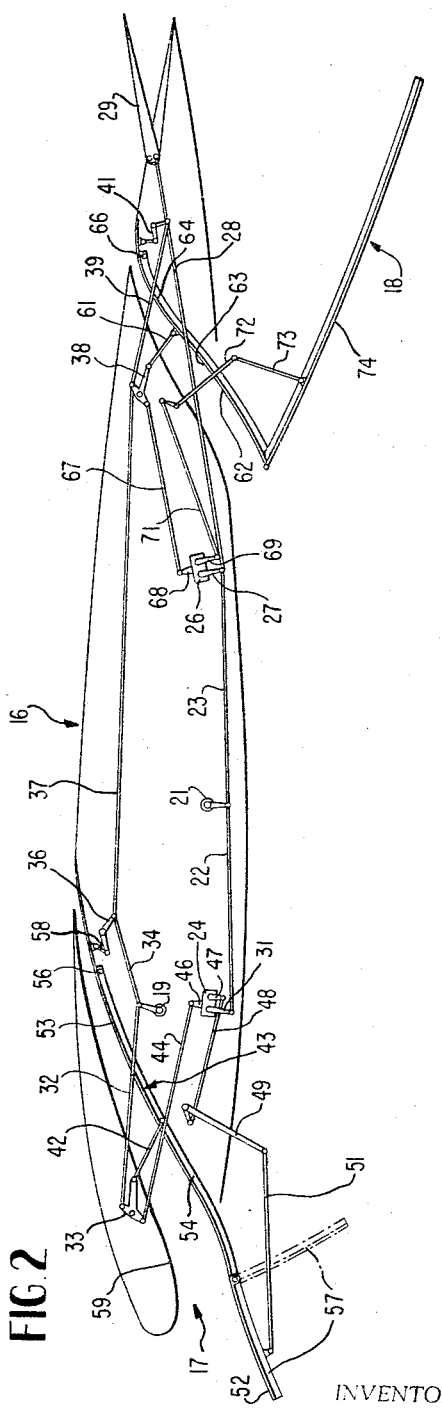
FIGURE 2 is a view similar to FIGURE 1 showing the lift-increasing devices in a configuration for high-lift operation.

Referring now to FIGURE 2, the airfoil and the components thereof are shown in an actuated condition. The scoops are shown actuated by rotation of the torque tube 19 which transmits movement to the scoop 43 through the forward rod 32, forward scoop bellcrank 33 and forward scoop actuation rod 42 to move the scoop downwardly into the airflow. Movement of the torque tube 19 also actuates the forward Venturi bellcrank 36 to open the upper portion of the Venturi formed by the scoop skin 53 to provide a passage for airflow between the skin 53 and the complementary forward skin 59. The movement of the upper portion of the Venturi is proportional to the amount of actuation of the scoop so that a variable Venturi is provided, the opening being dependent upon the amount of deflection of the scoop. The benefits of this proportionally variable Venturi will be described later.

Actuation of the rod 34 also moves the interconnecting rod 37 to actuate the rear scoop bellcrank 38, rear Venturi rod 39 and bellcrank 41 as well as the rear scoop actuator rod 61 to actuate the scoop and upper portion of the Venturi in an identical manner to that described for the forward scoop and Venturi. Actuation of the bellcranks 33 and 38 also, through movement of the forward flap regulating rod 44 and rear flap rod 67 depending upon the amount of actuation of these members provides a corresponding transmission of movement between the input arms 31 and 27 and the flap actuating arms 47 and 69 of the respective compensating mechanisms. This condition then causes, when the torque tube 21 is actuated, corresponding actuation of the forward and rear flaps 52 and 74 respectively through the corresponding push-pull rods and bellcranks.

The structure and mechanical linkages as described above thereby provides independent actuation of the spoiler 29 for normal flight control, independent actuation of the scoops 43 and 62 for maximum glide configurations or simultaneous actuation of the scoops, spoiler and flaps 52 and 74 for increased lift capability particularly suitable for landing and take-off configurations. The spoiler 29 and the flap 74 combine to produce somewhat the same effect as a split flap in deflecting the airflow at the trailing edge of the wing. In addition the action of the flap 74, increases airflow through the Venturi passage formed in the rear wing by the airfoil and scoop skin.

Insofar as the size of the Venturi openings and the ratio of opening to exit of the passage are concerned, these dimensions and ratios may be of whatever value which gives optimum lift and efficiency to the wing. This optimum efficiency is, of course, a function of factors such as wing loading, planform wing shape, chord configuration, etc. It has been found with an airfoil embodying device in accordance with the invention tested in a wind tunnel that an opening of 8 percent of the chord length of the wing with an exit of 2 percent of the chord of the wing yielded optimum results for that particular configuration. The wind tunnel tests have also shown a desirability of increasing the size of dimension of the exit of the passage when the scoop is lowered to large opening settings. As compared to flight tests using a fixed exit dimension of 1 percent of the wing chord, low minimum flight speeds on the order of 19 miles per hour were achieved. The wind tunnel tests have shown that increasing the dimension of the exit size with the larger entrance size, increased lift co-efficients will be obtained and stable flight may be maintained at even lower air speeds. As described above, the structure of this invention requires the operation of the scoop in conjunction with a change of the air passage dimensions in proporton to the scoop operation to yield the above-described benefits. The increase in exit dimension allows a greater volume of air to be passed through the Venturi with less spillage at the entrance thereof and therefore, provides for injection of greater quantities of air at higher velocities into the arflow over the upper portion of the wng to increase the flow circulation therearound and thereby provided lift at lower air speeds than heretofore possible. As the scoop is retracted into the wing, all of the dimensions decrease proportionally until the scoop entrance and scoop exit are fully closed to provide a flush lower and upper airflow surface for low drag cruise and high speed flight as is shown in FIGURE 1 of the drawings.

Insofar as the chordwise disposition of the lift-increasing devices of this inventon is concerned, it has been found that with a forward scoop-flap combination beginning with the opening thereof at between 10 and 15 percent of the chord on the lower surface of the wing and the exit at between 30 and 35 percent of the chord length of the wing, and with the rear scoop being disposed with the opening in the neighborhood of 60 to 65 percent of the chord length of the wing and the exit between 75 to 80 percent of the chord length of the wing, optimum effectiveness in increasing the lift in the wing can be achieved. Insofar as the lift-increasng effect of the above-described device is concerned, flight tests were made on the airplane using a forward Venturi scoop system on the outer panels of an aircraft wing with and without a conventional three-quarter span slotted flap. With the flaps alone the airplane lost its lift between 41 and 44 miles per hour. With the flaps and the outer wing panels scoops in a full open condition, the aircraft could fly at approximately 19 miles per hour without loss of altitude. The major advantage provided by the scoop flap system is the ability to create a natural high-volume, high-flow-rate air stream from the Venturi exits while the aircraft is at a minimum arcraft flight speed, thereby increasng the lift on the wings and preventing separation of the boundary layer in a flight regime where a slot or a slat would have already lost its effectiveness. The provision of a variable drag capability offered by the forward and rearward scoops and flaps in addition to the high lift provided also affords an advantage for slow, steep descent landing maneuvers.

In FIGURE 3 of the drawings a further embodiment of the invention is shown. Parts in FIGURE 8 corresponding to similar parts in FIGURES 1 and 2 are indicated by like numerals only of the next higher order. In this embodiment a forward lift-increasing device shown generally at 217 comprising a scoop in accordance with applicant's above-mentioned prior patent, is combined with a scoop-flap device shown generally at 218 of the type shown in FIGURES 1 and 2. A control crank 221, operated through cables from aircraft controls (not shown) actuates a forward spoiler 220 and an input arm 227 of a compensating mechanism 226 through forward and rearward push rods 222 and 223 respectively. A rear spoiler push rod 228 connects the input arm 227 to a rear spoiler 229. A torque tube 219, through a crank 233, actuates a forward scoop push rod 242 which is pivotally connected to a forward scoop 243 and Venturi push rod 234. The push rod 234 is connected to a Venturi bellcrank 258, pivoted at 236, which in turn is connected to the scoop skin as shown. An interconnecting push-pull rod 237 connects the bellcrank 258 to a rear scoop bellcrank 238 mounted proximate the rear scoop. The remaining connecting links are similar to those described in FIGURES 1 and 2 and are indicated by the same next higher order numbers. The operation of this version of FIGURE 3 is essentially the same as that of FIGURES 1 and 2 with the exception that there is no forward flap deployed and, for the purposes of illustration, the variable exit of the rear Venturi has been omitted. The configuration of FIGURE 3 will provide less of a lift in increasing affect than will that of FIGURES 1 and 2 and is included primarily to show the adaptability of the scoop-flap devices and the operating mechanisms therefor.

Figure 4:
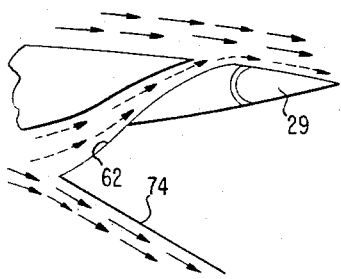
FIGURE 4 is a segmented view of a portion of an airfoil in elevation showing the airflow around one of the lift-increasing devices functioning in accordance with the invention.

Turning now to FIGURE 4 of the drawings, a schematic view is shown of the trailing edge portion of an airfoil which has incorporated therein a scoop flap mechanism in accordance with the invention. In this view, the scoop and flaps are shown in an actuated condition and the resulted arflow through and around the device is illustrated by arrows. A high dynamic pressure area created by the device exists ahead of the scoop-flap juncture. The natural airflow over the wing is indicated by the solid arrows in this figure, while the diverted airflow caused by operation of the scoop and flap device is indicated by the broken arrows. The primary effect of the Venturi is to accelerate the flow diverted by the scoop-flap structure so that the accelerated flow entering the air circulation above the wing increases that circulation thereby preventing low speed stall of the wing. Every nozzle or Venturi structure has an optimum ratio between the inlet and the throat thereof whereby the acceleration of the flow therethrough is accomplished with the greatest efficiency. The maximum flow through the Venturi is furthermore governed by the width of the throat and once this maximum flow for a given throat is reached, the flow in excess of that will spill over the inlet and be wasted. By providing a variable Venturi, the ratio between the throat and inlet can be kept optimum thereby providing the most efficient acceleration of flow for any amount of scoop-flap deflection and, the throat can be widened to accommodate increased flow into the Venturi provided by the increased flow diversion capability of the scoop-flap structure.

With reference to the flap effect of the scoop 62 and flap 74, the presence of the structure beneath the wing provides a simulated downward deflection of a portion of the chord of the wing at that point effectively making the ordinants of the means camber line more positive in this region and, as a consequence, increases the lift at any given angle of attack. The success of a flap as a lift-increasing device is based on the fact that, although the stalling angle is reduced by the deflection of the conventional flap, the reduction is not great enough to remove the gain arising for the shift of the lift curve as a whole. The invention as thus far described thereby provides the combination of the lift-increasing benefits achieved through a provision of a Venturi-type passage through the wing to increase the boundary layer energy and total airfoil circulation and the provision of a scoop-flap structure depending beneath the wing to further increase the lift by the effect of changing the mean camber line of the wing.

Figure 5:
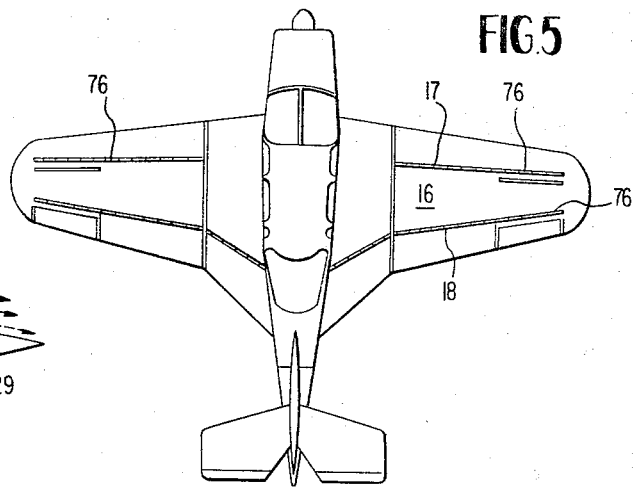
FIGURE 5 is a planform view of an aircraft incorporating lift-increasing devices in accordance with the invention.

Referring now to FIGURE 5 of the drawings an aircraft incorporating the devices of the invention in accordance with FIGURES 1 and 2 is shown. In this view the forward scoop-flap system is located proximate the leading edge of the wing 16 and extends along the outboard portion of the wing. The rearward scoop-flap system 18 extends substantially the entire span of the wing. Chord-wise extending structural members 76 span the devices as necessary to maintain the structural integrtiy of the wing and thereby divides each device into span-wise segments. In the disposition of the structure as shown, the scoops are eliminated from the forward inboard section of the wing to allow the placement of fuel tanks in this area. The exact disposition of these devices will, of course, depend on such factors as the structural and storage requirements of the individual aircraft and it should be understood that the exact placement of the devices will be dictated by the specific requirements of the particular type of aircraft on which they are installed.

Figure 6:
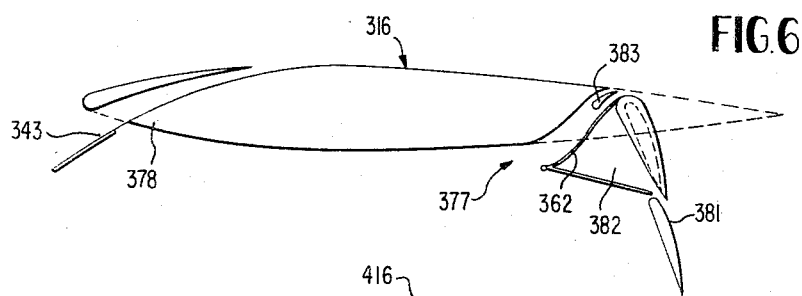
FIGURE 6 is an elevational section of an airfoil incorporating a lift-increasing device comprising another embodiment of the lift-increasing device in accordance with this invention.

In FIGURE 6 a variation of this invention is shown with a forward lift-increasing device 378 in accordance with FIGURES 1 and 2 and a rearward lift-increasing device 377, comprising a modified scoop-flap structure in accordance with this invention, combined with a Fowler-type flap 381. The Fowler-type flap structure and the operation thereof is commonly known in the art. It basically consists of a flap which is lowerable and is provided with a rearwardly movable portion which extends in an essentially co-planar fashion on track structures to substantially increase the chord of the flap when in use. Two positions of this extensible flap are shown in solid and broken lines in FIGURE 6.

A further modification embodied in the lift-increasing device 377 consists of the addition of end plates 382 on each side of the scoop 362. These end plates may be disposed on each of the chord wise structural elements 76 (FIGURE 5) or may be disposed at any suitable interval along one or both sides of each of the openings between these structural elements as desired. They may also obviously be supplied only on the rear lift-increasing device or the forward lift-increasing device as may be determined necessary by tests. These end plates, used in conjunction with the scoop or scoop-flap systems prevent air spillage from the entrance to the passage to which they are next adjacent thereby increasing the flow through the passage with the resultant increase in lift produced thereby. The end plates may be fixed with respect to the scoop, as in this case, fixed with respect to the wing surface or retractible into the wing as will be shown later. Still a further modification of the basic invention shown in FIGURE 6 consists of an airfoil shaped divider 383 at the passage exit portion thereof, which creates a double channel jet exit. This divider provides two high volume, high velocity exits in place of one exit and may be designed to be fixed in one position or may be equipped with apparatus (not shown) to pivot it on a spanwise axis so as to change the respective exit dimensions of the channels as well as the direction of the airflow. The divider 383 may also be used in conjunction with a spoiler or any of the other aforementioned standard control surfaces.

Figure 7:
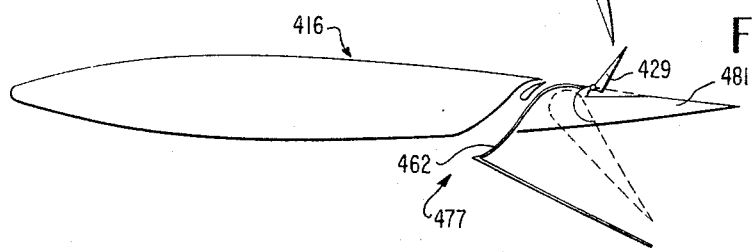
FIGURE 7 is a view similar to FIGURE 6 showing a lift-increasing device in accordance with FIGURES 1 and 2 used with a lift-increasing and control device of the prior art.

In FIGURE 7, an airfoil 416 is provided with a rearwardly disposed lift-increasing device 477 in combination with a spoiler 429 and a conventional flap or flaperon 481. In modern high speed aircraft, roll control is generally accomplished by different control members depending upon the speed regime in which the aircraft is operating. At high speed, such control is generally accomplished by killing a portion of the lift on one wing through the use of spoilers. The conventional control surfaces are used either alone or in combination with the spoilers at lower flight speeds since spoilers alone are less effective in this regime. This combination thereby provides a combination control and lift-increasing device particularly adapted for use on high-speed aircraft.

Figure 8:
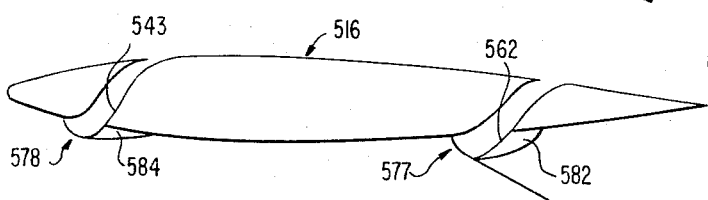
FIGURE 8 illustrates a modification of the lift-increasing device of the invention in combination with movable end plates.
Figure 8A:
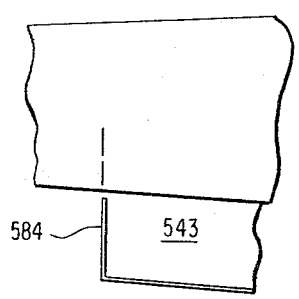
FIGURE 8A is a fragmentary end view of the device of FIGURE 8.

Turning now to FIGURE 8, a rearward lift-increasing device 577 which comprises a scoop-flap 562 in accordance with the invention but modified with end plates 582 is combined with a forward lift-increasing device 578 which comprises the scoop structure 543 of applicant's above-referred to patent also modified with end plates 584. In FIGURE 8A a front view of the scoop 543 and end plate 584 of FIGURE 8 is shown. As can be seen in this view the end plate 584 is mounted on the transverse end of the scoop 543 and moves therewith so that the end plate retracts and extends with movement of the scoop itself.

FIGURES 9 and 9A illustrates a combination similar to that of FIGURES 8 and 8A wherein the end plates 678 and 682 are fixed to the lower surface of the airfoil 616. These end plates could be designed to remain permanently extended or could be provided with separate retracting mechanisms to provide retraction thereof separately from the scoops 643 and 662.

The airfoil 716 of FIGURE 10 is provided with a rear lift-increasing device 777 which consists of a scoop 762 and flap 774 in accordance with the invention modified to have an additional flap 781 mounted on the rear face of the flaps 774 on tracks so that it can be lowered rearwardly in a manner of the above-referred-to Fowler flap to increase the flap effect of the device.

FIGURE 11 is an elevational view of an airfoil 816 incorporating a rear lift-increasing device 877 which incorporates a modified scoop-flap arrangement in accordance with the invention. In this device, the scoop 862 is provided with a pivotally mounted lowerable flap 881 disposed behind the structure of the scoop itself. Other than the mounting of the flap on the rearward portion of the scoop the remaining components of operation of the system is identical to that disclosed in the embodiments of FIGURE 1 and FIGURE 2.

It should be understood, of course, that each of the above-mentioned combinations could be further combined with one another or other prior art devices as desired without departing from the scope of this invention. It is primarily intended, by illustrating the aforegoing combinations, to give examples of the various uses to which the device of this invention may be put to thereby show the versatility thereof either alone or in combination with the prior art devices. What has been set forth above is therefore intended to be exemplary to enable those skilled in the art to understand the specific teaching of the inventor as well as the various ways in which the invention may be practiced. It should, therefore, be understood that within the scope of the appended claims, the invention may be practiced otherwise than as specifically described.

What is new and desired to be protected by Letters Patent of the United States is:

1. An airfoil for an aircraft, said airfoil having:
 at least one upwardly and rearwardly sloping passage disposed therethrough and extending span-wise for at least a portion of the span of said airfoil, said passage having a forward and rearward wall thereto, said walls defining a Venturi passage with the restricted portion thereof disposed proximate the upper end thereof, at least one of said walls being flexible and deformable between a position abutting the other of said walls to close at least the upper portion of said passage and a position spaced from said other wall to provide an opening therebetween, and means to flex said wall to deform same between said positions;
 a movable scoop disposed beneath said airfoil in coincidence and coextensive with said passage, said scoop having a span-wise component which comprises the lower portion of the rearward wall of said passage, said span-wise component being pivotal between a retracted position abutting the lower portion of said forward wall to close the lower portion of said passage and an extended position to provide an opening thereof and to direct air therein, and means to actuate said span-wise component between the extended and retracted positions;
 a span-wise flap pivotally connected to the span-wise component of said scoop, said flap being movable between a retracted position substantially parallel to the lower surface of said airfoil and an extended position extending downwardly and rearwardly at an angle to the lower surface of said airfoil, said flap extending below said span-wise component when extended, and means to actuate said flap between said extended and retracted positions.

2. An airfoil in accordance with claim 1 wherein a plate is disposed beneath said airfoil at at least one of the span-wise ends of said passage, said plate extending substantially chord-wise of said airfoil and depending essentially perpendicular thereto.

3. An airfoil in accordance with claim 1 wherein the means to flex said wall, the means to actuate said span-wise component and the means to simultaneously actuate said flap are interconnected and actuate the respective components of said airfoil to which they are connected.

4. An airfoil in accordance with claim 1 wherein said flap is substantially coextensive in a span-wise direction with said span-wise component.

5. An airfoil in accordance with claim 1 wherein said flap is connected to said span-wise component and the lower forward edge thereof.

6. An airfoil for an airplane having a fixed front wall intermediate the leading edge and trailing edge and extending from the top to the bottom surfaces thereof, a cooperating movable wall hinged at a point adjacent the top surface of said airfoil to define with said fixed front wall an upwardly and rearwardly directed Venturi passage extending from the bottom to the top surface of said airfoil, said fixed front wall being of concave convex configuration, said rear wall having a configuration complementary to the fixed front wall with the concave portion of the rear wall being disposed at the lower portion thereof and terminating in a free end engageable with the bottom surface of said airfoil to form a closure for said Venturi passage, a pivotal arm supporting the rear wall hinge point, said arm being swingable to move the portion of said rear wall proximate said hinge point into engagement with an adjacent portion of said forward wall, said rear wall defining with the adjacent portion of said forward wall an exit of independently variable cross-sectional area for said Venturi passage, means for moving said rear wall with respect to the fixed front wall to project the free end and the concave portion of said rear wall below the bottom surface of said airfoil to vary the cross-sectional area of the entrance of said Venturi passage, means to swing said pivotal arm to vary the cross-sectional area of the exit of said Venturi passage, and means associated with the lower portion of said rear wall to increase airflow through said Venturi passage.

7. An airfoil having an upwardly and rearwardly directed Venturi extending therethrough from its under face to and adjacent but short of its upward face, said passage including a fixed front wall and a deformable concave convex scoop shaped rear wall, said rear wall being hinged adjacent the upper surface of said airfoil and providing a variable jet exit for said passage between said rear wall and said upper surface of said airfoil, said rear wall having its free end engaging the bottom surface of said airfoil to form a closure for said Venturi passage, means for moving and projecting said concave portion of the rear wall through and below the under face of said rear wall for directing air into said Venturi passage, a flap pivotally connected to said scoop, said flap being movable between the retracted position substantially parallel to the lower surface of said airfoil and an extended position downwardly and rearwardly at an agle to the lower surface of said airfoil, said flap extending below said scoop when extended, and means to actuate said flap between said extended and retracted positions.

8. An airfoil in accordance with claim 7 wherein said flap is connected to the free end of said scoop.

9. An airfoil in accordance with claim 7 wherein means are provided to decrease the air pressure on the upper surface of said airfoil comprising a chamber in said airfoil adjacent said passage jet exit, an inwardly swinging rigid door hinged to the upper face of said airfoil and normally lying in the same plane with the upper face of said airfoil and closing said jet exit and chamber, and means for variably moving said door into said chamber and exposing said jet exit to allow air to be projected over said door upon opening of said Venturi passage by said scoop rear wall.

10. An airfoil in accordance with claim 1 wherein said span-wise component further comprises a rearwardly extending member disposed substantially parallel to the lower surface of said airfoil and said flap is pivotally connected to the rear end of said rearwardly extending member.

11. An airfoil having an upwardly and rearwardly directed Venturi extending therethrough from its lower surface to its upper surface, means to vary the size of the entrance to said Venturi and a second means to vary the throat size of said Venturi, said first and second means being interconnected to provide a predetermined throat size for a corresponding entrance size of said Venturi to furnish optimum capacity flow therethrough to augment the fluid circulation about said airfoil.

12. An airfoil in accordance with claim 11 when said last-mentioned means includes an extendible member to divert airflow beneath the airfoil into said Venturi.

References Cited

UNITED STATES PATENTS

| | | | |
|---|---|---|---|
| 2,366,751 | 1/1945 | Read | 244—42 |
| 2,368,205 | 1/1945 | Diehl | 244—91 |
| 2,557,829 | 6/1951 | Lavelle | 244—42 |
| 2,587,359 | 2/1952 | Milans | 244—42 |
| 2,678,784 | 4/1954 | Lanier | 244—42 |
| 2,920,844 | 1/1960 | Marshall et al. | 244—42 |

MILTON BUCHLER, *Primary Examiner.*

FERGUS S. MIDDLETON, *Examiner.*

B. BELKIN, *Assistant Examiner.*